(12) United States Patent
Tsukagoshi

(10) Patent No.: US 10,587,851 B2
(45) Date of Patent: Mar. 10, 2020

(54) PROJECTOR AND METHOD OF CONTROLLING PROJECTOR

(71) Applicant: SEIKO EPSON CORPORATION, Tokyo (JP)

(72) Inventor: Shinichi Tsukagoshi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/525,663

(22) Filed: Jul. 30, 2019

(65) Prior Publication Data

US 2020/0045278 A1 Feb. 6, 2020

(30) Foreign Application Priority Data

Jul. 31, 2018 (JP) ................. 2018-143264

(51) Int. Cl.
  *H04N 9/31* (2006.01)
  *G03B 21/14* (2006.01)
  *G03B 21/00* (2006.01)

(52) U.S. Cl.
  CPC ......... *H04N 9/3185* (2013.01); *G03B 21/142* (2013.01); *H04N 9/3105* (2013.01); *H04N 9/3188* (2013.01); *G03B 21/006* (2013.01)

(58) Field of Classification Search
  CPC .. H04N 9/3185; H04N 9/3105; H04N 9/3188; H04N 9/3197; H04N 9/31; H04N 9/28; H04N 5/74; H04N 3/26; H04N 3/22; H04N 3/223; H04N 3/23; G03B 21/142; G03B 21/006; G03B 21/14; G03B 21/147

USPC .... 348/744–747, 806, 807, 704; 353/69, 70, 353/30, 31
  See application file for complete search history.

(56) References Cited

U.S. PATENT DOCUMENTS

| 2014/0036236 A1* | 2/2014 | Shishido | G03B 21/142 353/31 |
| 2016/0037145 A1* | 2/2016 | Tsukagoshi | H04N 9/3185 348/745 |
| 2019/0104292 A1* | 4/2019 | Oka | H04N 9/3185 |

FOREIGN PATENT DOCUMENTS

| JP | 2006-018131 A | 1/2006 |
| JP | 2006-259287 A | 9/2006 |
| JP | 2007-108404 A | 4/2007 |
| JP | 2017-053953 A | 3/2017 |

* cited by examiner

*Primary Examiner* — Sherrie Hsia
(74) *Attorney, Agent, or Firm* — Oliff PLC

(57) ABSTRACT

A projector includes a projection section having a light source, a light modulation device and a projection lens, and modulating light emitted from the light source with the light device, and then projecting the light modulated through the projection lens to project a projection image on a screen, a projection optical system drive section for changing a projection position of the projection image, a projection control section for making the light device display a reduced input image, and a shift control section for controlling the projection optical system drive section wherein the projection position of the projection image when displaying the reduced input image at a central display position and at a shift display position become the same when the projection control section changes the display position of the reduced input image from the central display position to the shift display position in a display area of the light device.

10 Claims, 9 Drawing Sheets

PROJECTOR AND METHOD OF CONTROLLING PROJECTOR

The present application is based on, and claims priority from JP Application Serial Number 2018-143264, filed Jul. 31, 2018, the disclosure of which is hereby incorporated by reference herein in its entirety.

BACKGROUND

1. Technical Field

The present disclosure relates to a projector, and a method of controlling a projector.

2. Related Art

In the past, there has been known a technology of resolving burn-in occurring in a device for displaying an image (see, e.g., JP-A-2017-53953 (Document 1)). Document 1 discloses a technology of shifting an image displayed in a display area of a liquid crystal panel to a non-display area to move a projection position of a projection image toward an opposite direction to the shift direction of the image using a lens shift function of an optical system to thereby resolving the burn-in of the liquid crystal panel while preventing the shift of the projection position.

However, the technology disclosed in Document 1 requires to be provided with a liquid crystal panel large in display area in order to keep the non-display area, and therefore incurs an increase in cost.

SUMMARY

An advantage of the present disclosure is to make it possible to resolve the burn-in of the display device while suppressing the increase in cost.

A projector according to an aspect of the present disclosure includes a projection section including a light source, an electro-optic device and a projection lens, and configured to modulate light emitted from the light source with the electro-optic device, and project the light modulated through the projection lens to project a projection image on a projection surface, a projection position adjustment section configured to shift the projection lens to change a projection position of the projection image, a display control section configured to make the electro-optic device display a second image obtained by reducing a first image to be displayed by the electro-optic device, and a position control section configured to control the projection position adjustment section so that the projection position of the projection image when displaying the second image at a first position and the projection position of the projection image when displaying the second image at a second position become same as each other when the display control section changes a display position of the second image from the first position to the second position in a display area of the electro-optic device.

The aspect of the present disclosure may be configured such that the display control section changes the display position of the second image from the first position to the second position in sync with a shift of the projection lens by the projection position adjustment section.

The aspect of the present disclosure may be configured such that the projector further includes a size control section configured to make the projection lens magnify the projection image so that a size of the projection image when the electro-optic device displays the second image and a size of the projection image when the electro-optic device displays the first image become same in size.

The aspect of the present disclosure may be configured such that the display control section reduces the first image in sync with magnification of the projection image by the size control section.

The aspect of the present disclosure may be configured such that the display control section makes the electro-optic device alternately perform first display of displaying the first image and second display of displaying the second image.

The aspect of the present disclosure may be configured such that the display control section makes the second position different every time the display control section performs the second display.

The aspect of the present disclosure may be configured such that the display control section makes the electro-optic device perform the second display when the first display has been performed for a predetermined time.

The aspect of the present disclosure may be configured such that the display control section makes the electro-optic device perform the second display when the projection section has projected the same projection image for more than a predetermined time.

The aspect of the present disclosure may be configured such that the projector further includes a calculation section configured to calculate a parameter related to a keystone distortion correction of the projection image in accordance with a shift of the projection lens.

A method of controlling a projector according to another aspect of the present disclosure is a method of controlling a projector provided with a projection section including a light source, an electro-optic device and a projection lens, and configured to modulate light emitted from the light source with the electro-optic device, and project the light modulated through the projection lens to project a projection image on a projection surface, and a projection position adjustment section configured to shift the projection lens to change a projection position of the projection image. The method includes making the electro-optic device display a second image obtained by reducing a first image to be displayed by the electro-optic device, and controlling the projection position adjustment section so that the projection position of the projection image when displaying the second image at a first position and the projection position of the projection image when displaying the second image at a second position become same as each other when the display control section changes a display position of the second image from the first position to the second position in a display area of the electro-optic device.

DESCRIPTION OF AN EXEMPLARY EMBODIMENT

Figure 1:
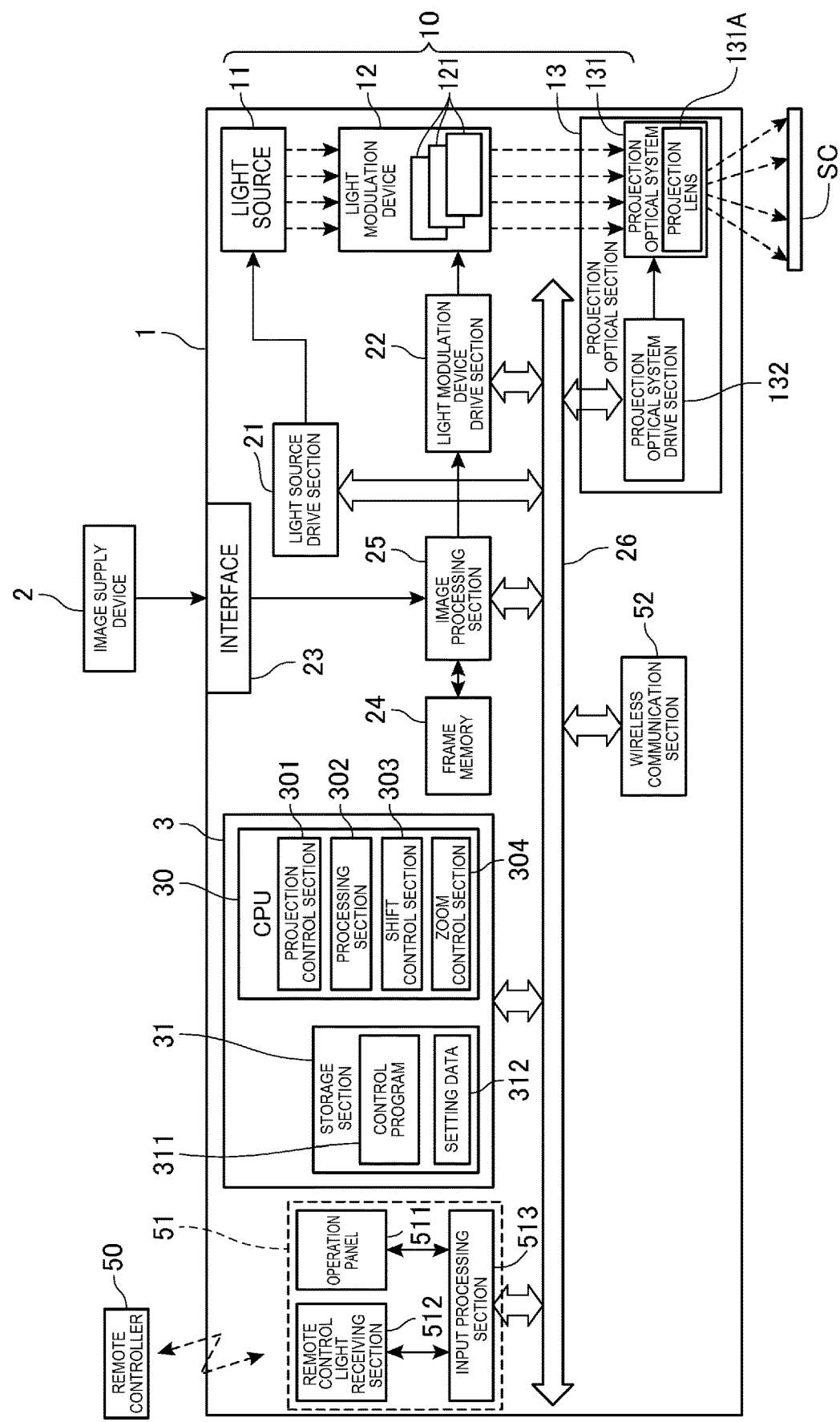
FIG. 1 is a block diagram showing a configuration of a projector.

FIG. 1 is a block diagram showing a configuration of a projector 1.

To the projector 1, there is coupled an image supply device 2 as an external device. The image supply device 2 outputs image data to the projector 1. The projector 1 projects a projection image TG on a screen SC based on image data input from the image supply device 2. The screen SC corresponds to a projection surface according to the present disclosure.

The image data input from the image supply device 2 is image data compliant with a predetermined standard. The image data can be still image data or can also be moving image data, and can also be accompanied by audio data.

The image supply device 2 is a so-called image source for outputting the image data to the projector 1. A specific configuration of the image supply device 2 is not particularly limited, and is only required to be equipment which can be coupled to the projector 1 to output the image data to the projector 1. It is also possible to use, for example, a disk-type recording medium reproduction device, a television tuner device, or a personal computer.

The screen SC can also be a curtain-like screen, or it is also possible to use a wall surface of a building, or a plane of an installation as the screen SC. The screen SC is not limited to a plane, but can also be a curved surface or a surface having asperity.

The projector 1 is provided with a control section 3 for controlling each section of the projector 1, and a projection section 10 for projecting the projection image TG. The control section 3 is constituted by a CPU 30, a storage section 31 and so on. The storage section 31 is a storage device for storing a control program 311 to be executed by the CPU 30 and data in a nonvolatile manner, and is constituted by a semiconductor storage element or the like such as a flash ROM. The storage section 31 can also include a RAM constituting a work area for the CPU 30.

The CPU 30 executes the control program 311 for the projector 1 stored in the storage section 31 to thereby function as a projection control section 301, a processing section 302, a shift control section 303 and a zoom control section 304. The projection control section 301 corresponds to a display control section according to the present disclosure. The shift control section corresponds to a position control section according to the present disclosure. Further, the zoom control section corresponds to a size control section according to the present disclosure. By the CPU 30 executing the control program 311, these functional blocks are realized with the cooperation between software and hardware.

The storage section 31 stores setting data 312 in addition to the control program 311. The setting data 312 includes setting values related to an operation of the projector 1. The setting values included in the setting data 312 are, for example, the processing content to be executed by an image processing section 25 and parameters used in the process of the image processing section 25. It is also possible for the storage section 31 to store other programs and data.

The projection section 10 is provided with a light source 11, a light modulation device 12 and a projection optical section 13. The light modulation device 12 corresponds to an electro-optic device according to the present disclosure.

The light source 11 is constituted by a lamp such as a halogen lamp, a xenon lamp or a super-high pressure mercury lamp, or a solid-state light source such as an LED or a laser source. The light source 11 is put on by the electrical power supplied from a light source drive section 21, and emits light toward the light modulation device 12.

The light source drive section 21 supplies the light source 11 with a drive current or a pulse in accordance with the control by the control section 3 to make the light source 11 emit the light.

The light modulation device 12 is provided with three liquid crystal panels 121 corresponding respectively to the three primary colors of RGB. The light emitted by the light source 11 is separated into colored light beams of three colors of RGB, and the colored light beams are made to enter the respective liquid crystal panels 121 of the corresponding colors due to dichroic mirrors, reflecting mirrors, relay lenses and so on. The liquid crystal panels 121 are each have a configuration in which a liquid crystal material is encapsulated between a pair of transparent substrates. Each of the liquid crystal panels 121 has a rectangular pixel area having a plurality of pixels arranged in a matrix, and the light modulation device drive section 22 applies the drive voltage to the liquid crystal material pixel by pixel.

The image data separated into the three primary colors of R, G and B is input to the light modulation device drive section 22 from the image processing section 25 described later. The light modulation device drive section 22 converts the image data of each color input thereto into a data signal suitable for the operation of the corresponding one of the liquid crystal panels 121. The light modulation device drive section 22 applies the drive voltage corresponding to the data signal thus converted to each of the pixels of each of the liquid crystal panels 121 to thereby draw the image on each of the liquid crystal panels 121 frame by frame. Thus, the light emitted from the light source 11 is modulated by the light modulation device 12 into image light.

The projection optical section 13 images the light modulated by the light modulation device 12 on the screen SC to project the projection image TG. The projection optical section 13 is provided with a projection optical system 131 and a projection optical system drive section 132. The projection optical system drive section 132 corresponds to a projection position adjustment section according to the present disclosure.

The projection optical system 131 is provided with a projection lens 131A for projecting the image light modulated by the light modulation device 12 in an enlarged manner. The projection lens 131A is a zoom lens for projecting the image light modulated by the light modulation device 12 on the screen SC at a desired magnification ratio. The projection lens 131A is formed of a lens group including a plurality of lenses.

The projection optical system drive section 132 is coupled to a bus 26. The projection optical system drive section 132 is constituted by a stepping motor, gears and so on not shown, and adjusts the lens position of the projection lens 131A in accordance with the control by the control section 3. The projection optical system drive section 132 moves the projection lens 131A in a plane perpendicular to the optical axis of the projection lens 131A to perform a lens shift adjustment of moving the projection image TG to be projected on the screen SC in vertical and horizontal directions. Further, the projection optical system drive section 132 performs an alignment of each the lenses of the projection lens 131A to thereby perform a zoom adjustment of expanding or contracting the projection image TG projected on the screen SC.

The projector 1 is provided with an interface 23, a frame memory 24, an image processing section 25, an operation section 51 and a wireless communication section 52. These sections are coupled to the control section 3 via a bus 26 so as to be able to perform data communication.

The interface 23 is a wired interface for the data communication, and is provided with a connector, an interface circuit and so on compliant with a predetermined communication standard. In FIG. 1, illustration of the connector and the interface circuit is omitted. The interface 23 is coupled to the image supply device 2 via a cable, and transmits and receives image data, control data and so on to and from the external device in accordance with the control by the control section 3. As the interface 23, there can be adopted a variety of communication interfaces and an interface for inputting an image.

The frame memory 24 is provided with a plurality of banks. Each of the banks has a storage capacity sufficient for writing one frame of image data. The frame memory 24 is formed of, for example, an SDRAM. It should be noted that SDRAM is an abbreviation of synchronous dynamic random access memory.

The image processing section 25 executes image processing such as a resolution conversion process, a resizing process, a correction of a distortion aberration, a shape correction process, a digital zoom process and an adjustment of the tint and luminance of the image on the image data developed in the frame memory 24. The image processing section 25 executes the process designated by the control section 3, and executes the process using a parameter input from the control section 3 as needed. Further, it is obviously possible for the image processing section 25 to execute two or more of the processes described above in combination with each other.

The image processing section 25 reads out the image data on which the process has been executed from the frame memory 24, and then outputs the image data to the light modulation device drive section 22.

The operation section 51 is provided with an operation panel 511, a remote control light receiving section 512 and an input processing section 513.

The operation panel 511 is provided to a housing of the projector 1, and is provided with a variety of switches which can be operated by a user. The input operation section 513 detects an operation of each of the switches of the operation panel 511.

The remote control light receiving section 512 receives an infrared signal transmitted by the remote controller 50. The input processing section 513 decodes the signal received by the remote control light receiving section 512 to generate operation data, and then outputs the operation data to the control section 3.

The input processing section 513 is coupled to the operation panel 511 and the remote control light receiving section 512. When the operation panel 511 or the remote control light receiving section 512 has received an operation by the user, the input processing section 513 generates the operation data corresponding to the operation thus received, and then outputs the operation data to the control section 3.

The wireless communication section 52 is provided with an antenna, an RF circuit and so on not shown, and performs the wireless data communication with an external device in accordance with the control by the control section 3. The wireless communication section 52 performs the wireless communication compliant with, for example, wireless LAN or Bluetooth. Bluetooth is a registered trademark.

Then, functional blocks of the CPU 30 will be described.

The projection control section 301 controls the light source drive section 21 and the light modulation device drive section 22 to put the light source 11 on, makes the light modulation device drive section 22 drive the light modulation device 12, and makes the projection section 10 project the projection image TG. Further, the projection control section 301 controls the image processing section 25 to execute the image processing on the image data input to the interface 23, and then makes the light modulation device drive section 22 output the image data on which the image processing has been executed. Thus, the projection control section 301 makes the liquid crystal panels 121 of the light modulation device 12 display the image.

The processing section 302 executes a process of resolving the burn-in of each of the liquid crystal panels 121. In the following description, the process of resolving the burn-in of the liquid crystal panel 121 is referred to as a burn-in resolution process. The burn-in resolution process will be described later.

The burn-in of the liquid crystal panels 121 is an after-image phenomenon caused by eccentric location of some of the liquid crystal molecules in the liquid crystal material, or eccentric location of some of the ion impurities in the liquid crystal material due to migration of the liquid crystal molecules, and occurs pixel by pixel in each of the liquid crystal panels 121. The burn-in of the liquid crystal panel 121 is apt to occur when projecting the same projection image TG for a long period of time, and the longer the projection time is, the higher the degree of the eccentric location becomes, and the more notably the burn-in occurs. When the burn-in occurs in the liquid crystal panel 121, the modulation corresponding to the drive voltage applied is not achieved in a part where the burn-in occurs, and it results in that unevenness occurs in a part of the projection image TG corresponding to the part where the burn-in occurs. The processing section 302 executes the burn-in resolution process to thereby resolve the eccentric location of some of the liquid crystal molecules or the ion impurities to resolve the burn-in of the liquid crystal panels 121.

It should be noted that in the following description, the burn-in occurring in the liquid crystal panels 121 is referred to as burn-in of the light modulation device 12.

The shift control section 303 makes the projection optical system drive section 132 perform the lens shift adjustment. The shift control section 303 calculates a drive amount of the stepping motor, and then outputs a control signal including the drive amount thus calculated to the projection optical system drive section 132.

The zoom control section 304 makes the projection optical system drive section 132 perform the zoom adjustment. The zoom control section 304 calculates a drive amount of the stepping motor corresponding to the magnification ratio designated, and then outputs a control signal including the drive amount thus calculated to the projection optical system drive section 132.

Then, an operation of the projector 1 will be described.

The projector 1 has a normal mode and a burn-in resolution mode as operation modes.

The normal operation mode is an operation mode in which the light modulation device 12 makes normal display of displaying an input image in the entire area of a display area 121a of each of the liquid crystal panels 121 be performed, to thereby project the projection image TG on the screen SC. Hereinafter, the input image to be displayed in the entire area of the display area 121a of each of the liquid crystal panels 121 is referred to as an "entire-area input image." The entire-area input image ZNG corresponds to a first image according to the present disclosure. Further, the normal display corresponds to first display according to the present disclosure.

The burn-in resolution mode is an operation mode for resolving the burn-in of the light modulation device 12 by the processing section 302 executing the burn-in resolution process. In the burn-in resolution mode, the light modulation device 12 is made to perform shift display to project the projection image TG on the screen SC. The shift display is a display configuration of displaying the reduced input image SNG in the display area 121a of each of the liquid crystal panels 121 so that the center CC of the reduced input image SNG obtained by reducing the entire-area input image ZNG is shifted from the central position CI of the display area 121a of each of the liquid crystal panels 121. It should be noted that in the present embodiment, "shift" means that the display position of an image in the display area 121a of each of the liquid crystal panels 121 is moved from a certain display position to another display position different from the certain display position. The reduced input image SNG corresponds to a second image according to the present disclosure. Further, the shift display corresponds to second display according to the present disclosure.

Figure 2:
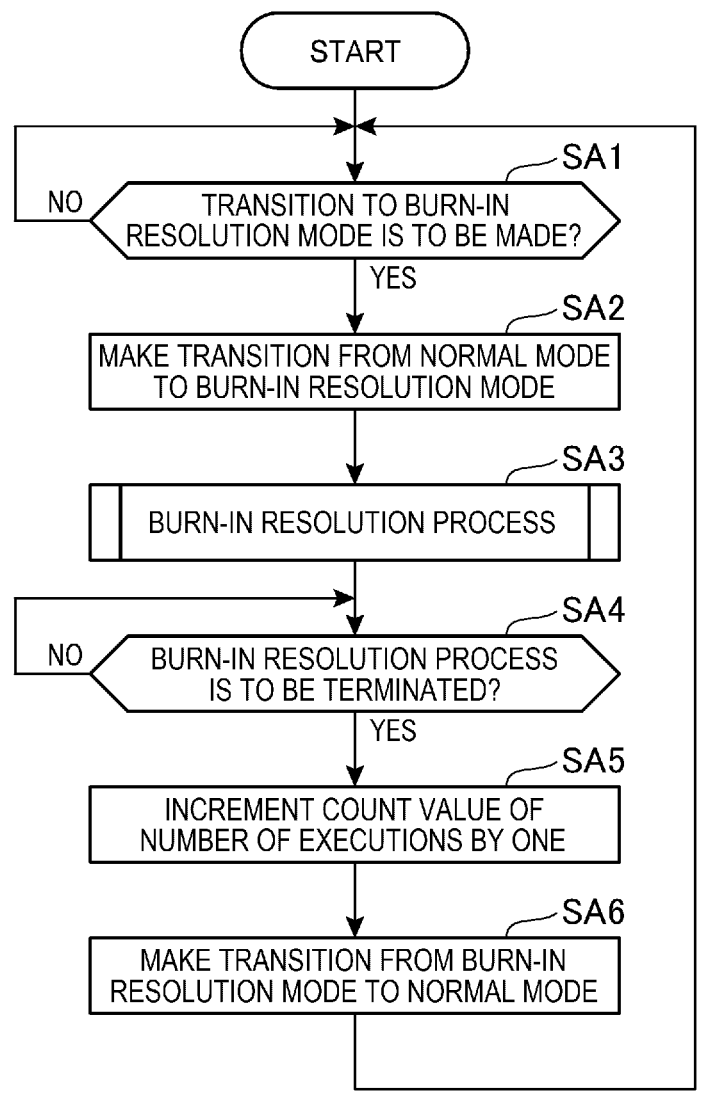
FIG. 2 is a flowchart showing an operation of the projector.

FIG. 2 is a flowchart showing the operation of the projector 1.

It is assumed that the operation mode of the projector 1 is the normal mode at the starting point of the flowchart shown in FIG. 2.

The processing section 302 of the control section 3 determines (step SA1) whether to make the transition of the operation mode of the projector 1 from the normal mode to the burn-in resolution mode. For example, when a predetermined period has elapsed from the transition to the normal mode, the processing section 302 determines that the transition of the operation mode of the projector 1 from the normal mode to the burn-in resolution mode is to be made (YES in the step SA1). Further, for example, when the same projection image TG has continuously been projected for more than a predetermined period in the normal mode, the processing section 302 determines that the transition of the operation mode from the normal mode to the burn-in resolution mode is to be made (YES in the step SA1). The predetermined period is appropriately determined in advance with a pretest, a simulation and so on.

When the processing section 302 has determined that the transition of the operation mode of the projector 1 from the normal mode to the burn-in resolution mode is to be made (YES in the step SA1), the processing section 302 makes (step SA2) the transition of the operation mode of the projector 1 from the normal mode to the burn-in resolution mode.

Subsequently, the processing section 302 executes (step SA3) the burn-in resolution process with the projection control section 301, the shift control section 303 and the zoom control section 304.

Figure 3:
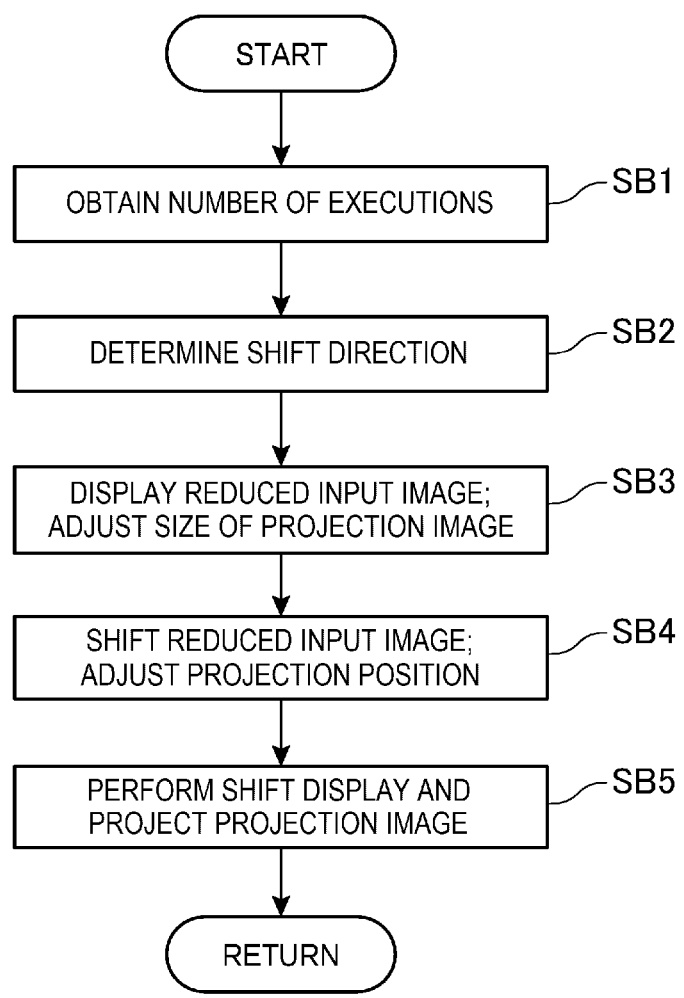
FIG. 3 is a flowchart showing an operation of the projector.

FIG. 3 is a flowchart showing an operation of the projector 1 in the burn-in resolution process.

The projection control section 301 obtains (step SB1) the number of executions of the burn-in resolution process from the storage section 31. The projection control section 301 cumulatively counts the number of executions of the burn-in resolution process while the projector 1 is running, and then stores the count value thus obtained in the storage section 31.

The projection control section 301 determines (step SB2) a shift direction as a direction in which the center CC of the reduced input image SNG is shifted from the central position CI of the display area 121a of each of the liquid crystal panels 121. For example, the storage section 31 stores correspondence information having the number of executions of the burn-in resolution process and the information representing the shift direction associated with each other. The projection control section 301 determines the shift direction based on the number of executions obtained in the step SB1 with reference to the correspondence information stored by the storage section 31.

Subsequently, the projection control section 301 makes (step SB3) the image processing section 25 display the reduced input image SNG in the display area 121a of each of the liquid crystal panels 121.

Figure 4:
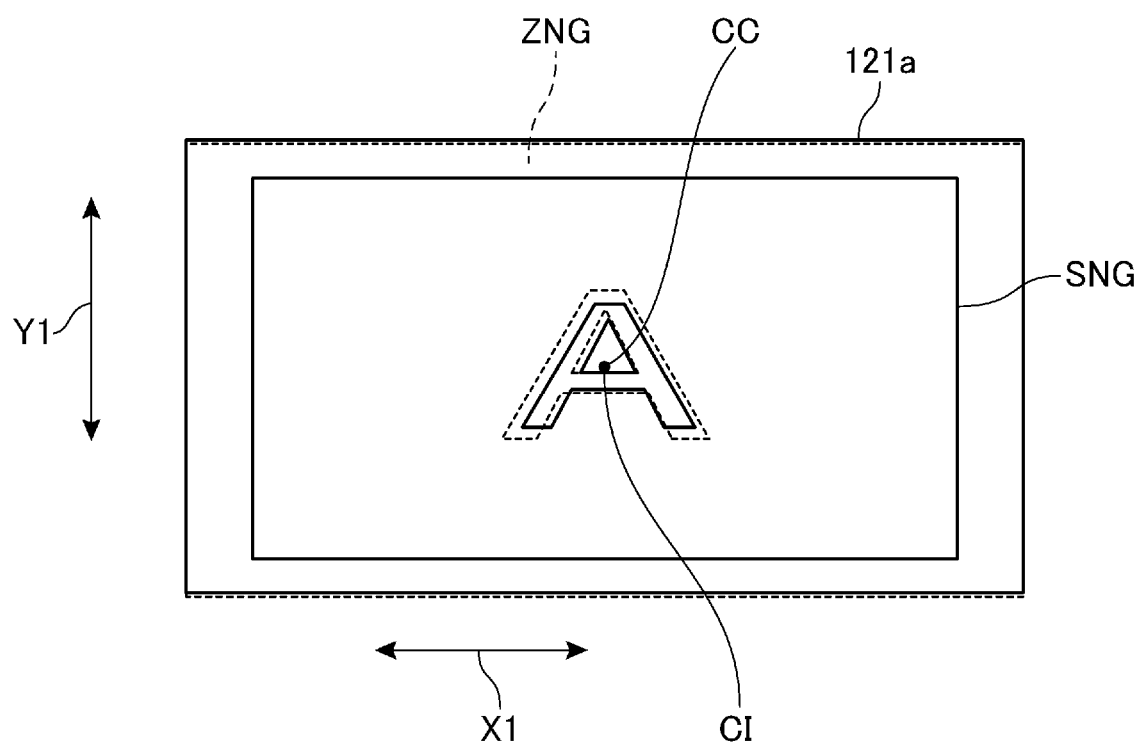
FIG. 4 is a diagram for explaining a reduced input image.

FIG. 4 is a diagram for explaining the reduced input image SNG.

In FIG. 4, the direction indicated by the reference symbol X1 represents a horizontal direction of the display area 121a of each of the liquid crystal panels 121, and represents right and left directions of the display area 121a. Further, in FIG. 4, the direction indicated by the reference symbol Y1 represents the vertical direction of the display area 121a of each of the liquid crystal panels 121, and represents the up and down directions of the display area 121a.

The projection control section 301 makes the image processing section 25 reduce the entire-area input image ZNG at a predetermined reduction ratio. The predetermined reduction ratio is determined in advance with a pretest, a simulation and so on. The image processing section 25 reduces the entire-area input image ZNG centered on the central position CI of the display area 121a without changing the aspect ratio of the image. Thus, the reduced input image SNG having the center CC located at the central position CI of the display area 121a is displayed in the display area 121a of each of the liquid crystal panels 121.

Reference to FIG. 3, in the step SB3, the zoom control section 304 makes the projection optical system drive section 132 perform the zoom adjustment to adjust (step SB3) the size of the projection image TG in addition to the display of the reduced input image SNG.

In the step SB3, the zoom control section 304 makes the projection lens 131A magnify the projection image TG so that the size of the projection image TG when the light modulation device 12 displays the entire-area input image ZNG and the size of the projection image TG when the light modulation device 12 displays the reduced input image SNG become the same is size. For example, when the projection control section 301 makes the image processing section 25 reduce the entire-area input image ZNG at the reduction ratio of "α," the zoom control section 304 makes the projection optical system drive section 132 perform the zoom adjustment so as to project the projection image TG at the magnification ratio obtained by multiplying the magnification ratio when projecting the entire-area input image ZNG by a magnification ratio of "1/α." By making the projection lens 131A magnify the projection image TG in such a manner, it is possible to prevent the size of the projection image TG from changing between before and after displaying the reduced input image SNG.

In the step SB3, the projection control section 301 makes the image processing section 25 reduce the entire-area input image ZNG in sync with the magnification of the projection image TG by the projection lens 131A. Thus, it is possible to prevent the size of the projection image TG from changing in accordance with the reduction of the entire-area input image ZNG when reducing the entire-area input image ZNG to make the light modulation device 12 display the reduced input image SNG. Therefore, there is no chance to provide the user with a feeling of strangeness or an uncomfortable feeling caused by the change in size of the projection image TG when reducing the entire-area input image ZNG.

Subsequently, the projection control section 301 shifts (step SB4) the reduced input image SNG toward the shift direction determined in the step SB2.

Figure 5:
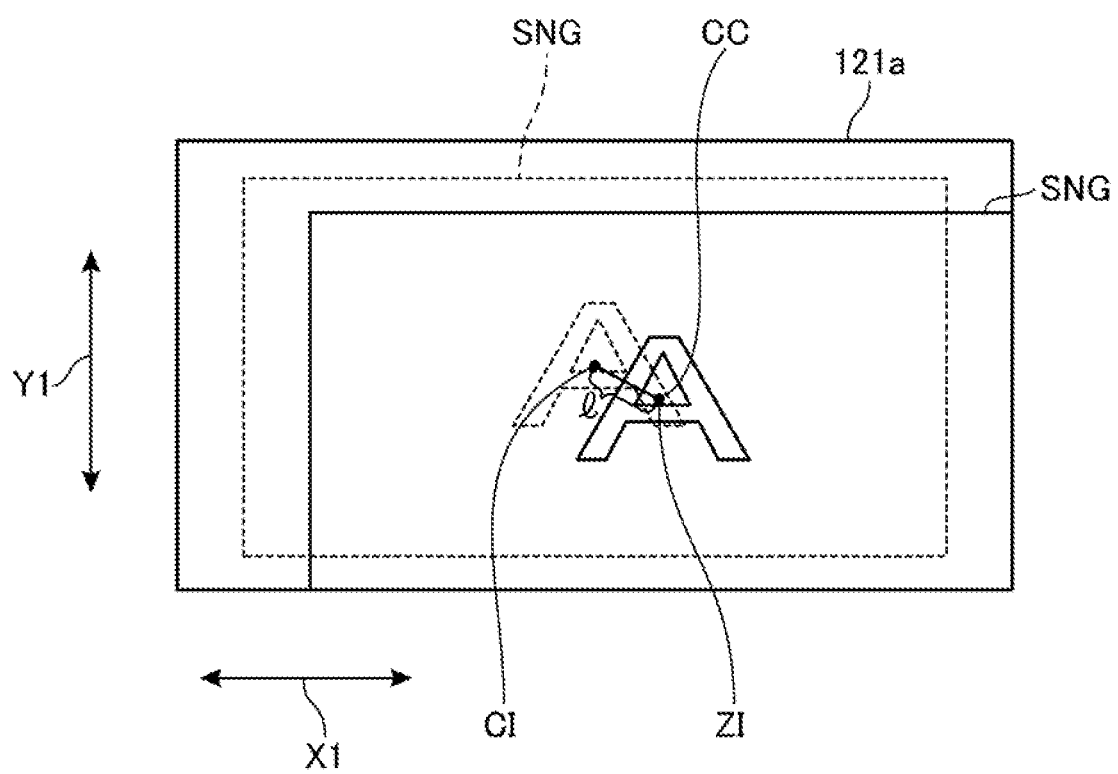
FIG. 5 is a diagram for explaining shift of the reduced input image.

FIG. 5 is a diagram for explaining the shift of the reduced input image SNG.

FIG. 5 illustrates when the shift direction is determined as a lower right direction in the display area 121a of each of the liquid crystal panels 121 in the step SB2.

The projection control section 301 makes the image processing section 25 shift the center CC of the reduced input image SNG from the central position CI of the display area 121a to the shift position ZI toward the lower right direction. The image processing section 25 shifts the center CC of the reduced input image SNG from the central position CI of the display area 121a so that the reduced input image SNG is displayed so as to be shifted toward the lower right side in the display area 121a. The shift amount is appropriately determined with a pretest, a simulation or the like so that the reduced input image SNG is displayed so as to be shifted toward the lower right side in the display area 121a, and is associated with the shift direction. It should be noted that the frame memory 24 is provided with an area for image processing corresponding to the display area 121a of each of the liquid crystal panels 121, and the image processing section 25 changes the display position of the reduced input image SNG in the area for image processing to thereby display the reduced input image SNG so as to be shifted toward the lower right side in the display area 121a.

In the following description, the display position of the reduced input image SNG having the center CC located at the central position CI of the display area 121a is referred to as a central display position in the display area 121a. The central display position corresponds to a first position according to the present disclosure. Further, the display position of the reduced input image SNG having the center CC located at the shift position ZI shifted from the central position CI of the display area 121a is referred to as a shift display position in the display area 121a. The shift display position corresponds to a second position according to the present disclosure.

Reference to FIG. 3, in the step SB4, in addition to shifting the reduced input image SNG in the display area 121a, the shift control section 303 makes the projection optical system drive section 132 perform the lens shift adjustment to adjust (step SB4) the position of the projection image TG.

Figure 6:
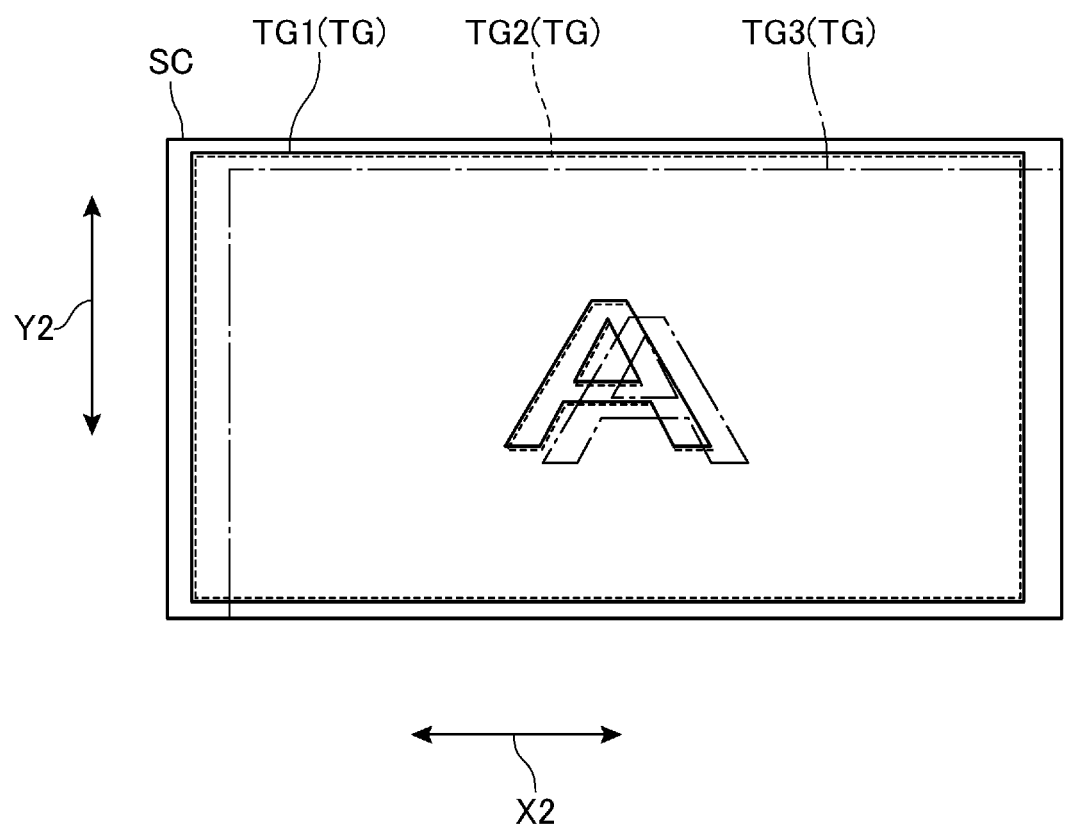
FIG. 6 is a diagram showing an example of a projection position of a projection image.

FIG. 6 is a diagram showing an example of the projection position of the projection image TG.

In FIG. 6, the direction indicated by the reference symbol X2 is a horizontal direction of the screen SC, and corresponds to right and left directions of the screen SC. Further, in FIG. 6, the direction indicated by the reference symbol Y2 is a vertical direction of the screen SC, and corresponds to up and down directions of the screen SC.

In FIG. 6, there is illustrated the projection image TG when the reduced input image SNG is shifted toward the lower right side in the display area 121a of each of the liquid crystal panels 121. In FIG. 6, the three projection images TG are illustrated as the projection images TG1, TG2 and TG3 for the sake of convenience. The projection image TG1 corresponds to the projection image TG when displaying the reduced input image SNG at the central display position. The projection image TG2 corresponds to the projection image TG when displaying the reduced input image SNG at the shift display position, and at the same time the projection image TG after the lens shift adjustment has been performed. The projection image TG3 corresponds to the projection image TG when displaying the reduced input image SNG at the shift display position, and at the same time the projection image TG before performing the lens shift adjustment.

When the projection control section 301 makes the image processing section 25 shift the display position of the reduced input image SNG from the central display position to the shift display position, the projection image TG is projected so as to be shifted toward the lower right side of the screen SC as represented by the projection image TG3 in FIG. 6. Therefore, the shift control section 303 moves the projection image TG toward the upper left side of the screen SC so that the projection position of the projection image TG3 becomes the same as the projection position of the projection image TG1. The shift control section 303 calculates the drive amount of the stepping motor corresponding to the shift amount of the reduced input image SNG, and then makes the projection optical system drive section 132 perform the lens shift adjustment in the opposite direction to the shift direction based on the drive amount thus calculated.

In such a manner, the shift control section 303 makes the projection optical system drive section 132 perform the lens shift adjustment. Thus, it is possible to prevent the projection position of the projection image TG in the screen SC from changing between before and after the change in the display position of the reduced input image SNG when changing the display position of the reduced input image SNG from the central display position to the shift display position.

In the step SB4, the projection control section 301 changes the display position of the reduced input image SNG from the central display position to the shift display position in sync with the shift of the projection lens 131A. Thus, it is possible to prevent the shift from occurring in the projection position of the projection image TG when changing the display position of the reduced input image SNG. Therefore, there is no chance to provide the user with a feeling of strangeness or an uncomfortable feeling caused by the shift of the projection position of the projection image TG when changing the display position of the reduced input image SNG.

Referring to FIG. 3, when executing the process of the steps SB3, SB4, the projection control section 301 makes the light modulation device 12 project (step SB5) the projection image TG, on which the lens shift adjustment and the zoom adjustment have been performed, on the screen SC while making the light modulation device 12 perform the shift display.

As described above, since the processing section 302 makes the light modulation device 12 perform the shift display in the burn-in resolution process, it is possible to apply the different drive voltage from that in the normal mode to each of the pixels of the liquid crystal panels 121. Therefore, it is possible for the processing section 302 to resolve the eccentric location of some of the liquid crystal molecules or the ion impurities to resolve the burn-in of the light modulation device 12. Further, in the burn-in resolution process, since the light modulation device 12 displays the reduced input image SNG, it is possible to resolve the burn-in of the light modulation device 12 without interrupting the projection of the projection image TG which has been projected in the normal mode. Further, since the projection position of the projection image TG is not shifted when performing the shift display, there is no chance to provide the user with a feeling of strangeness or an uncomfortable feeling caused by the shift of the projection position. Further, since the burn-in resolution process is executed while changing the display position of the reduced input image SNG, it is sufficient for the projector 1 to be provided with the liquid crystal panels 121 each having the minimum necessary display area 121a for displaying the entire-area input image ZNG. Therefore, it is possible to suppress the increase in cost of the projector 1.

Further, since the burn-in resolution process is executed without changing the size and the display position of the projection image TG, there is no chance that the size and the projection position of the projection image TG to be projected on the screen SC change between the normal mode and the burn-in resolution mode. Therefore, it is possible to resolve the burn-in of the light modulation device 12 while preventing the projection image TG from changing.

Referring to FIG. 2, the processing section 302 determines (step SA4) whether to terminate the burn-in resolution process. For example, when an execution time for executing the burn-in resolution process has been determined in advance, and the execution time has elapsed from when executing the burn-in resolution process, the processing section 302 determines to terminate the burn-in resolution process (YES in the step SA4).

When the processing section 302 has determined to terminate the burn-in resolution process (YES in the step SA4), the projection control section 301 increments (step SA5) the count value of the number of executions of the burn-in resolution process by one.

Subsequently, the processing section 302 makes (step SA6) the transition of the operation mode of the projector 1 from the burn-in resolution mode to the normal mode. When making the transition, the processing section 302 terminates the shift display, and then makes the light modulation device perform the normal display. When making the light modulation device 12 perform the normal display, the reduced input image SNG is magnified in sync with the zoom adjustment, and further, the display position of the reduced input image SNG is restored from the shift display position to the central display position in sync with the lens shift adjustment similarly to when executing the burn-in resolution process. Thus, it is possible to prevent the position of the projection image TG and the size of the projection image TG from changing when restoring the display configuration of the light modulation device 12 from the shift display to the normal display. Therefore, it is possible to make the transition of the operation mode from the burn-in resolution mode to the normal mode without providing the user with the feeling of strangeness or the uncomfortable feeling caused by the change in the projection image TG.

The processing section 302 returns the process to the step SA1, and then determines again whether to make the transition to the burn-in resolution mode.

Figure 7:
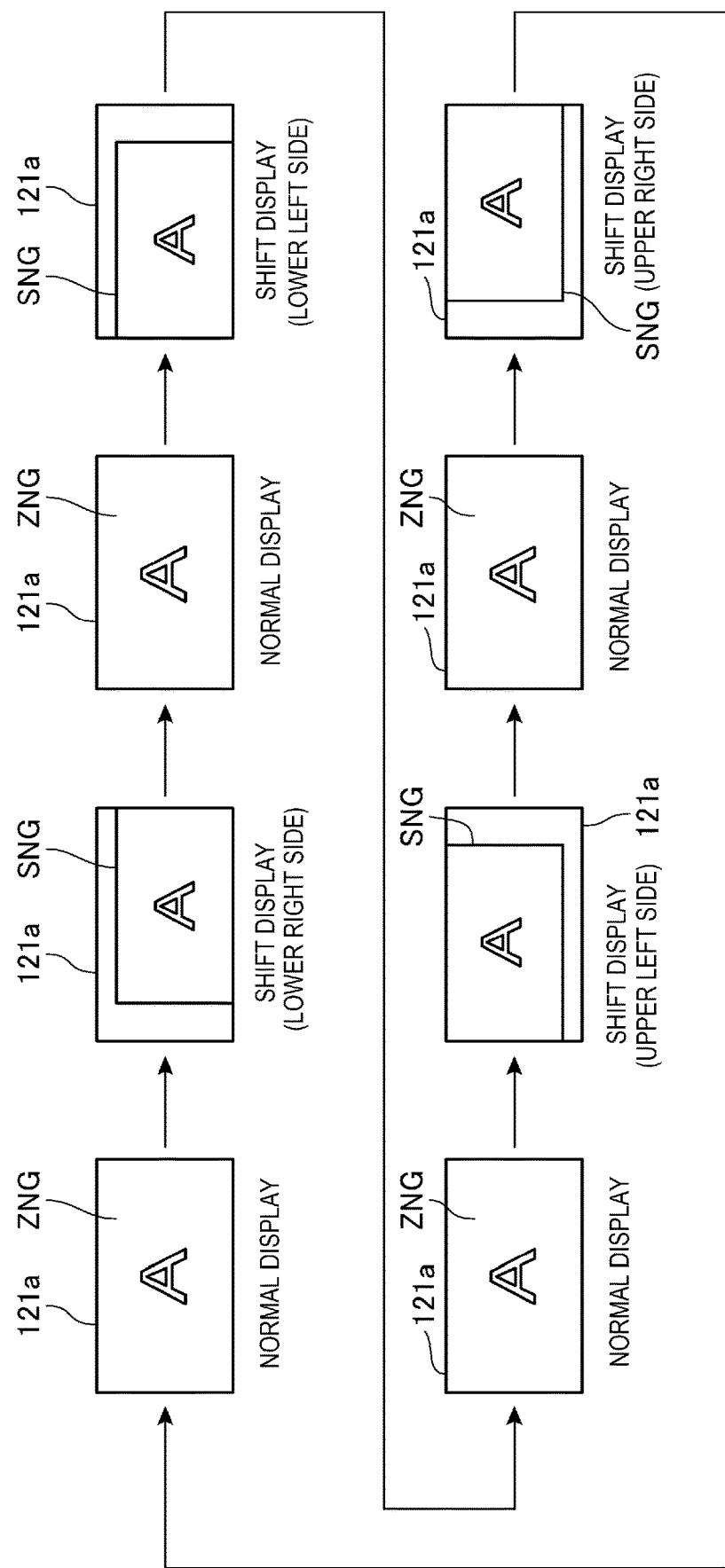
FIG. 7 is a diagram showing an example of a projection position of the reduced input image.

FIG. 7 is a diagram showing an example of the display position of the reduced input image SNG when the light modulation device 12 executes the shift display a plurality of times.

The projection control section 301 makes the light modulation device 12 alternately perform the normal display and the shift display. As shown in FIG. 7, the projection control section 301 makes the shift display position of the reduced input image SNG different every time the transition to the burn-in resolution mode is made to make the light modulation device 12 perform the shift display. In FIG. 7, the shift display position is made different so that the reduced input image SNG is shifted to the lower right side→the lower left side→the upper left side→the upper right side in the display area 121a of each of the liquid crystal panels 121 every time the shift display is performed.

As shown in FIG. 7, by making the shift display position of the reduced input image SNG different every time the light modulation device 12 is made to perform the shift display, there is no chance to display the reduced input image SNG every time at the same display position, and thus, it is possible to efficiently resolve the burn-in of the light modulation device 12.

As described hereinabove, the projector 1 is provided with the projection section 10 having the light source 11, the light modulation device 12 and the projection lens 131A, and modulating the light emitted from the light source 11 with the light modulation device 12, and then projecting the light thus modulated through the projection lens 131A to thereby project the projection image TG on the screen SC. Further, the projector 1 is provided with the projection optical system drive section 132 for shifting the projection lens 131A to change the projection position of the projection image TG. Further, the projector 1 is provided with the projection control section 301 for making the light modulation device 12 display the reduced input image SNG obtained by reducing the entire-area input image ZNG to be displayed on the light modulation device 12. Further, the projector 1 is provided with the shift control section 303 for controlling the projection optical system drive section 132 so that the projection position of the projection image TG when displaying the reduced input image SNG at the central display position and the projection position of the projection image TG when displaying the reduced input image SNG at the shift display position become the same when the projection control section 301 changes the display position of the reduced input image SNG from the central display position to the shift display position in the display area 121a of the light modulation device 12.

According to this configuration, there is no chance that the projection position of the projection image TG changes when resolving the burn-in of the light modulation device 12. Therefore, it is possible to resolve the burn-in of the light modulation device 12 without providing the user with the feeling of strangeness or the uncomfortable feeling caused by the change in projection position of the projection image TG. Further, it is possible to resolve the burn-in of the light modulation device 12 without interrupting the projection of the projection image TG which has been projected in the normal mode. Further, since the burn-in resolution process is executed while changing the display position of the reduced input image SNG, it is sufficient for the projector 1 to be provided with the liquid crystal panels 121 each having the minimum necessary display area 121a for displaying the entire-area input image ZNG. Therefore, it is possible to resolve the burn-in of the light modulation device 12 while suppressing an increase in cost of the projector 1.

Further, the projection control section 301 changes the display position of the reduced input image SNG from the central display position to the shift display position in sync with the shift of the projection lens 131A.

According to this configuration, it is possible to prevent the projection position of the projection image TG from changing when changing the display position of the reduced input image SNG, and it is possible to resolve the burn-in of the light modulation device 12 without providing the user with the feeling of strangeness or the uncomfortable feeling caused by the change in projection position of the projection image TG.

Further, the projector 1 is provided with the zoom control section 304 for making the projection lens 131A magnify the projection image TG so that the size of the projection image TG when the light modulation device 12 displays the reduced input image SNG and the size of the projection image TG when the light modulation device 12 displays the entire-area input image ZNG become the same is size.

According to this configuration, it is possible to prevent the size of the projection image TG from changing between before and after displaying the reduced input image SNG.

The projection control section 301 reduces the entire-area input image ZNG in sync with the magnification of the projection image TG by the zoom control section 304.

According to this configuration, it is possible to prevent the size of the projection image TG from changing when reducing the entire-area input image ZNG to make the light modulation device 12 display the reduced input image SNG. Therefore, it is possible to resolve the burn-in of the light modulation device 12 without providing the user with the feeling of strangeness or the uncomfortable feeling caused by the change in size of the projection image TG.

The projection control section 301 makes the light modulation device 12 alternately perform the normal display for displaying the entire-area input image ZNG and the shift display for displaying the reduced input image SNG.

According to this configuration, since there is no chance for the projection image TG to change between the normal display and the shift display, it is possible to make the light modulation device 12 alternately perform the normal display and the shift display while projecting the same projection image TG.

The projection control section 301 makes the shift display position different every time the projection control section 301 performs the shift display.

According to this configuration, since there is no chance to display the reduced input image SNG every time at the same display position, it is possible to efficiently resolve the burn-in of the light modulation device 12.

The projection control section 301 makes the light modulation device 12 perform the shift display when the projection control section 301 has performed the normal display for a predetermined time.

According to this configuration, since the burn-in of the light modulation device 12 can automatically be resolved, it is possible to resolve the burn-in of the light modulation device 12 at an appropriate timing without requiring great care of the user for the execution of the burn-in resolution process.

The projection control section 301 makes the light modulation device 12 perform the shift display when the projection section 10 has projected the same projection image TG for more than a predetermined time.

According to this configuration, since the burn-in of the light modulation device 12 can automatically be resolved, it is possible to resolve the burn-in of the light modulation device 12 at an appropriate timing without requiring great care of the user for the execution of the burn-in resolution process.

MODIFIED EXAMPLE

Then, a modified example will be described.

Figure 8:
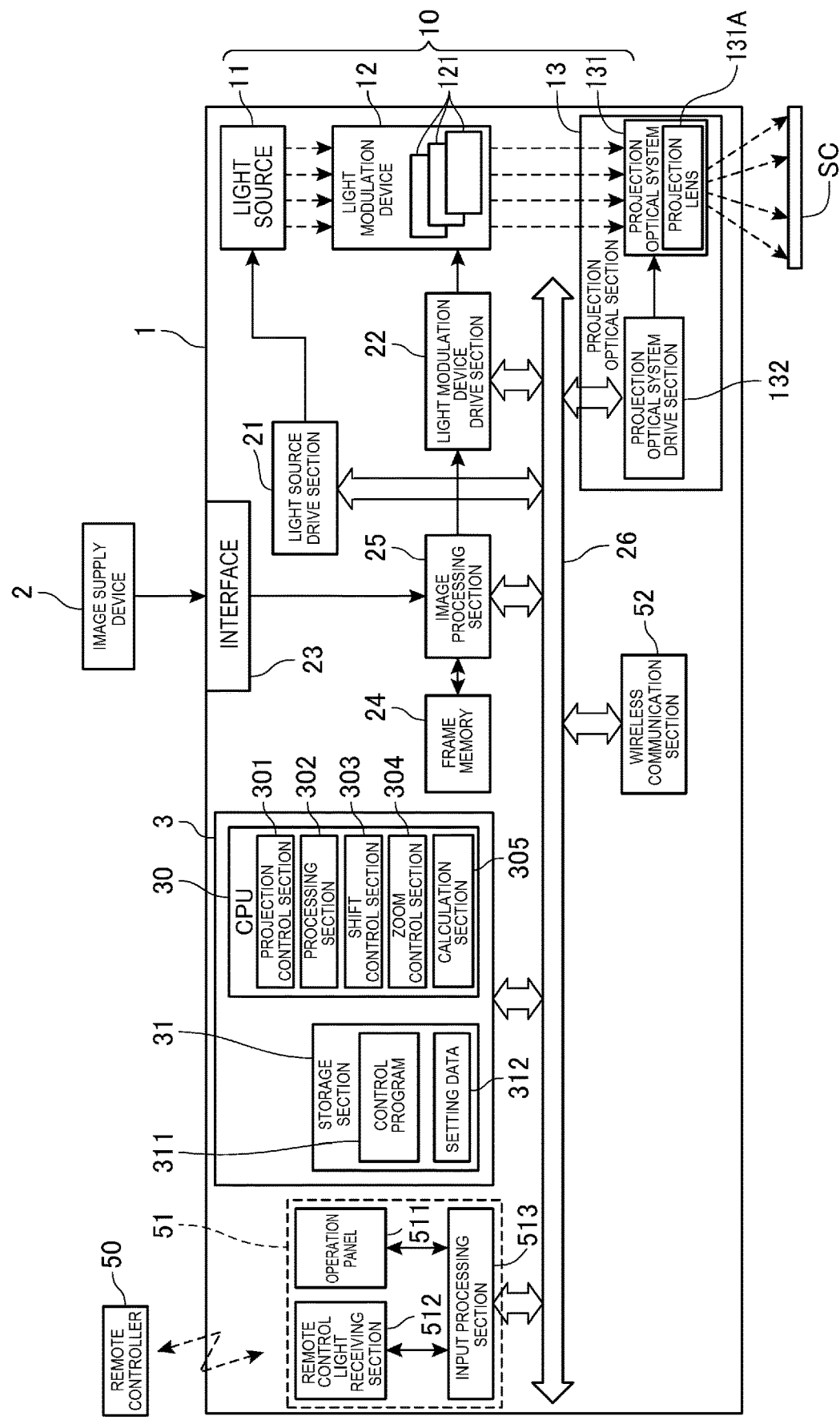
FIG. 8 is a block diagram showing a configuration of a projector according to a modified example.

FIG. 8 is a block diagram showing a configuration of a projector 1 according to the modified example.

In the description of FIG. 8, substantially the same constituents as the constituents of the projector 1 shown in FIG. 1 are denoted by the same reference numerals, and the detailed description thereof will be omitted.

As is obvious from the comparison between FIG. 1 and FIG. 8, in the projector 1 according to the modified example, the control section 3 further functions as a calculation section 305.

When the projection lens 131A is shifted while the image processing section 25 is performing a keystone distortion correction on the projection image TG, the calculation section 305 calculates parameters related to the keystone distortion correction in accordance with the shift of the projection lens 131A. As the parameters related to the keystone distortion correction, a conversion parameter for performing the conversion from a coordinate system of the display area 121a of each of the liquid crystal panels 121 to a coordinate system of the screen SC, for example, can be cited as an example. The calculation section 305 calculates the parameters related to the keystone distortion correction with a predetermined algorithm based on the lens shift amount and the shift direction of the projection lens 131A.

Figure 9:
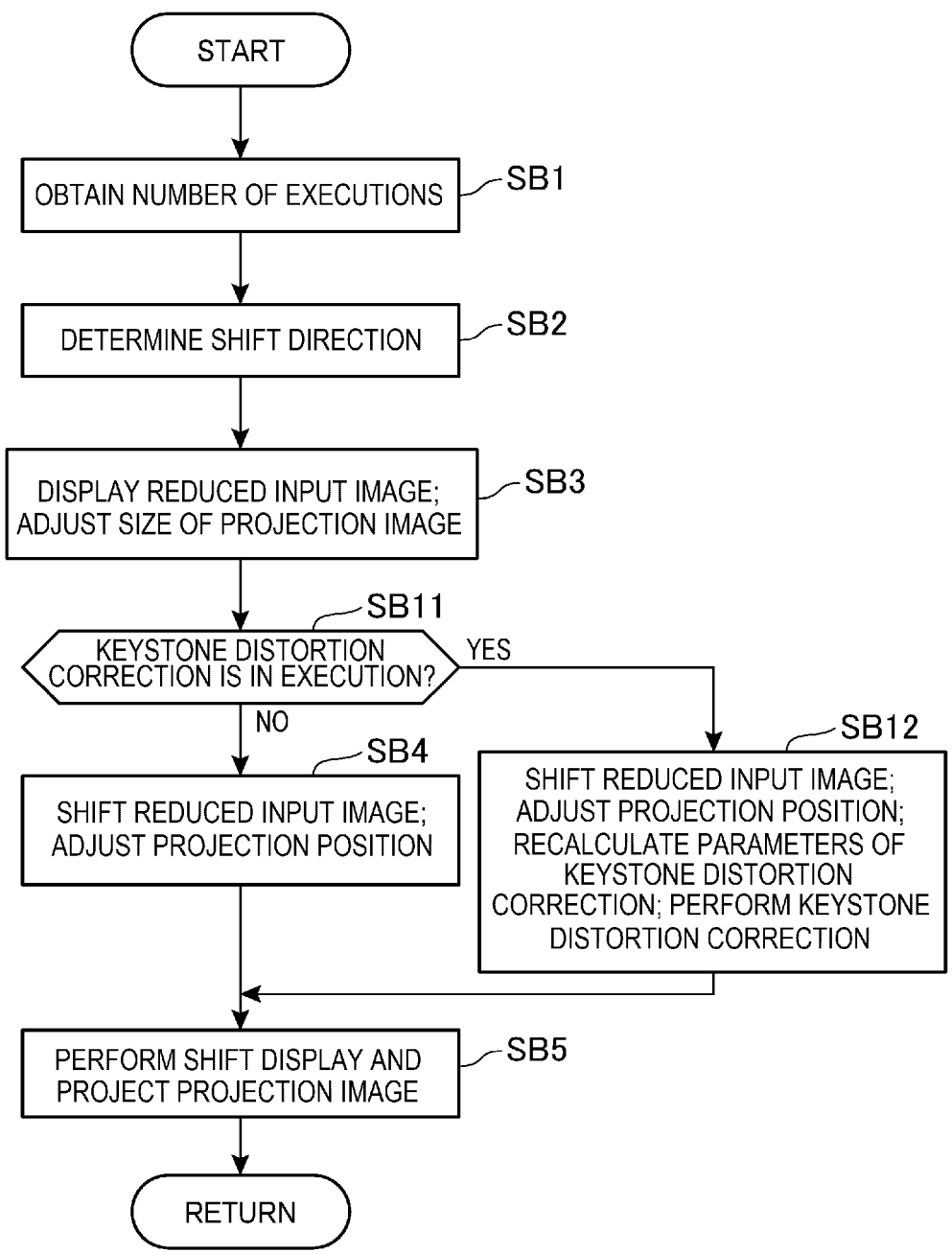
FIG. 9 is a flowchart showing an operation of the projector.

FIG. 9 is a flowchart showing the operation of the projector 1 according to the modified example. In the flowchart shown in FIG. 9, the processes common to those of the embodiment described above are denoted by the same step numbers, and the description thereof will be omitted.

When executing the process of step SB3, the calculation section 305 determines (step SB11) whether or not the keystone distortion correction is in execution. When the calculation section 305 has determined that the keystone distortion correction is not in execution (NO in the step SB11), the calculation section 305 executes the process of the step SB4. In contrast, when the calculation section 305 has determined that the keystone distortion correction is in operation (YES in the step SB11), the calculation section 305 sequentially calculates (step SB12) the parameters related to the keystone distortion correction in accordance with the shift of the projection lens 131A. Further, in the step SB12, the projection control section 301 outputs the parameters related to the keystone distortion correction thus calculated to the image processing section 25 every time the calculation section 305 performs the calculation to make (step SB12) the image processing section 25 perform the keystone distortion correction.

When the lens shift adjustment is performed while the keystone distortion correction is in execution, the shape of the projection image TG changes. Therefore, by the calculation section 305 calculating the parameters related to the keystone distortion correction in accordance with the shift of the projection lens 131A, it is possible to resolve the burn-in of the light modulation device 12 while preventing the shape of the projection image TG from changing due to the lens shift adjustment.

The embodiment described above is a preferred embodiment of the present disclosure. It should be noted that the present disclosure is not limited to the embodiment and the modified example, but can be implemented with a variety of modifications within the scope or the spirit of the present disclosure.

For example, when the method of controlling the projector 1 described above is realized using a computer provided to the projector 1, or an external device connected to the projector 1, it is also possible to configure the present disclosure as an aspect of a program executed by the computer for realizing the method, a recording medium storing the program in a computer-readable manner, or a transmission medium for transmitting the program. The method of controlling the projector 1 corresponds to a method of controlling the display device according to the present disclosure.

Further, the processing units of the flowchart shown in each of FIG. 2, FIG. 3 and FIG. 9 are obtained by dividing the process of the control section 3 of the projector 1 in accordance with major processing contents in order to make the process of the control section 3 easy to understand. The scope of the present disclosure is not limited by the way of the division or the names of the processing units shown in the flowchart of FIG. 2. Further, the process of the control section 3 can also be divided into a larger number of processing units, or can also be divided so that one processing unit includes a larger amount of process in accordance with the processing contents. Further, the processing sequence of each of the flowcharts described above is not limited to the illustrated examples.

Further, each of the functional sections of the projector 1 shown in FIG. 1 and FIG. 8 is for showing the functional configuration realized by the cooperation of the hardware and the software, and the specific installation configuration is not particularly limited. Therefore, it is not necessarily required to install the hardware corresponding individually to each of the functional sections, but it is obviously possible to adopt a configuration of realizing the functions of the plurality of functional sections by a single processor executing a program. Further, a part of the function realized by the software in the embodiment described above can also be realized by the hardware, or a part of the function realized by the hardware can also be realized by the software.

What is claimed is:

1. A projector comprising:
a projection section including a light source, an electro-optic device and a projection lens, and configured to modulate light emitted from the light source with the electro-optic device, and project the light modulated through the projection lens to project a projection image on a projection surface;
a projection position adjustment section configured to shift the projection lens to change a projection position of the projection image;
a display control section configured to make the electro-optic device display a second image obtained by reducing a first image to be displayed by the electro-optic device; and
a position control section configured to control the projection position adjustment section so that the projection position of the projection image when displaying the second image at a first position and the projection position of the projection image when displaying the second image at a second position become same as each other when the display control section changes a display position of the second image from the first position to the second position in a display area of the electro-optic device.

2. The projector according to claim 1, wherein
the display control section changes the display position of the second image from the first position to the second position in sync with a shift of the projection lens by the projection position adjustment section.

3. The projector according to claim 1, further comprising:
a size control section configured to make the projection lens magnify the projection image so that a size of the projection image when the electro-optic device displays the second image and a size of the projection image when the electro-optic device displays the first image become same in size.

4. The projector according to claim 3, wherein
the display control section reduces the first image in sync with magnification of the projection image by the size control section.

5. The projector according to claim 1, wherein
the display control section makes the electro-optic device alternately perform first display of displaying the first image and second display of displaying the second image.

6. The projector according to claim 5, wherein
the display control section makes the second position different every time the display control section performs the second display.

7. The projector according to claim 5, wherein
the display control section makes the electro-optic device perform the second display when the first display has been performed for a predetermined time.

8. The projector according to claim 5, wherein
the display control section makes the electro-optic device perform the second display when the projection section has projected the same projection image for more than a predetermined time.

9. The projector according to claim 1, further comprising:
a calculation section configured to calculate a parameter related to a keystone distortion correction of the projection image in accordance with a shift of the projection lens.

10. A method of controlling a projector including a projection section including a light source, an electro-optic device and a projection lens, and configured to modulate light emitted from the light source with the electro-optic device, and project the light modulated through the projection lens to project a projection image on a projection surface, and a projection position adjustment section configured to shift the projection lens to change a projection position of the projection image, the method comprising:
making the electro-optic device display a second image obtained by reducing a first image to be displayed by the electro-optic device; and
controlling the projection position adjustment section so that the projection position of the projection image when displaying the second image at a first position and the projection position of the projection image when displaying the second image at a second position become same as each other when the display control section changes a display position of the second image from the first position to the second position in a display area of the electro-optic device.

* * * * *